(12) United States Patent
Oba et al.

(10) Patent No.: US 9,638,908 B2
(45) Date of Patent: May 2, 2017

(54) IMAGE MEASUREMENT DEVICE

(71) Applicant: Keyence Corporation, Osaka (JP)

(72) Inventors: Hayato Oba, Osaka (JP); Koji Takahashi, Osaka (JP)

(73) Assignee: Keyence Corporation, Osaka (JP)

( * ) Notice: Subject to any disclaimer, the term of this patent is extended or adjusted under 35 U.S.C. 154(b) by 229 days.

(21) Appl. No.: 14/600,022

(22) Filed: Jan. 20, 2015

(65) Prior Publication Data
US 2015/0241680 A1  Aug. 27, 2015

(30) Foreign Application Priority Data

Feb. 27, 2014 (JP) ................................. 2014-037538

(51) Int. Cl.
*G02B 21/00* (2006.01)
*G01B 11/00* (2006.01)
(Continued)

(52) U.S. Cl.
CPC .......... *G02B 21/0016* (2013.01); *G01B 11/00* (2013.01); *G01B 11/028* (2013.01);
(Continued)

(58) Field of Classification Search
CPC .. G02B 21/0016; G02B 21/06; G02B 21/367; G02B 21/125; G02B 21/362;
(Continued)

(56) References Cited

U.S. PATENT DOCUMENTS 5,319,462 A * 6/1994 Haruki ............... H04N 5/23212
348/347
5,901,236 A * 5/1999 Mizui ..................... G01C 15/00
382/103

(Continued)

FOREIGN PATENT DOCUMENTS

JP  2012-032224  2/2012
JP  2012-032341  2/2012
(Continued)

*Primary Examiner* — Jay Patel
*Assistant Examiner* — Joseph Suh
(74) *Attorney, Agent, or Firm* — Kilyk & Bowersox, P.L.L.C.

(57) ABSTRACT

The image measurement device includes: a side-emitting illumination device that has a light amount distribution sharply changing in a photographing axis direction of a camera, and irradiates a workpiece on a movable stage with illumination light from a side; a measurement target place specifying part that specifies a measurement target place on a workpiece image; an illumination position adjusting part that moves the side-emitting illumination device in the photographing axis direction, to adjust a relative position of the side-emitting illumination device to the movable stage; a relative position identifying part that obtains a change in luminance in the measurement target place with respect to two or more of the workpiece images photographed by making the relative position different, to identify a relative position; an imaging control part that controls the illumination position adjusting part based on the identified relative position and drives the side-emitting illumination device.

10 Claims, 11 Drawing Sheets

MEASUREMENT UNIT 10

(51) Int. Cl.
*G01B 11/24* (2006.01)
*G02B 21/06* (2006.01)
*G02B 21/36* (2006.01)
*G06T 7/00* (2017.01)
*G01B 11/02* (2006.01)
*G06T 5/00* (2006.01)
*G06T 5/50* (2006.01)
*G02B 21/12* (2006.01)

(52) U.S. Cl.
CPC .............. *G01B 11/24* (2013.01); *G02B 21/06* (2013.01); *G02B 21/367* (2013.01); *G06T 5/007* (2013.01); *G06T 5/50* (2013.01); *G06T 7/0004* (2013.01); *G02B 21/125* (2013.01); *G02B 21/362* (2013.01); *G06T 2207/10056* (2013.01); *G06T 2207/10152* (2013.01); *G06T 2207/30164* (2013.01)

(58) Field of Classification Search
CPC ......... G06T 5/007; G06T 5/50; G06T 7/0004; G06T 7/0085; G06T 2207/30164; G06T 2207/10152; G06T 2207/10056; G01B 11/028; G01B 11/24; G01B 11/00
See application file for complete search history.

(56) References Cited

U.S. PATENT DOCUMENTS

| | | | | |
|---|---|---|---|---|
| 6,524,178 B1* | 2/2003 | Fassler | ............... | A22C 11/0245 452/37 |
| 6,677,987 B1* | 1/2004 | Girod | ................... | G06F 3/0386 348/171 |
| 9,151,600 B2* | 10/2015 | Nakatsukasa | .......... | G01B 11/25 |
| 9,207,186 B2* | 12/2015 | Schulz | ................. | G01N 21/896 |
| 2004/0246367 A1* | 12/2004 | Yoshida | ................. | G01B 11/02 348/370 |
| 2005/0131776 A1* | 6/2005 | Perotti | ............... | G06Q 30/0643 705/27.2 |
| 2006/0118742 A1* | 6/2006 | Levenson | ............ | A61B 5/0059 250/559.3 |
| 2006/0187337 A1* | 8/2006 | Ichikawa | ............... | G01D 5/347 348/370 |
| 2006/0279726 A1* | 12/2006 | Galambos | .......... | G06K 9/00221 356/71 |
| 2006/0280331 A1* | 12/2006 | Chosson | ............... | G07D 7/0013 382/100 |
| 2007/0285553 A1* | 12/2007 | Morita | ................. | H04N 5/2254 348/335 |
| 2008/0219515 A1* | 9/2008 | Namgoong | .......... | G06K 9/0061 382/117 |
| 2008/0267450 A1* | 10/2008 | Sugimoto | ............ | A63H 17/395 382/103 |
| 2010/0172598 A1* | 7/2010 | Kimura | ................... | G06T 5/006 382/296 |
| 2010/0183207 A1* | 7/2010 | Sakaguchi | ............. | A61B 6/507 382/128 |
| 2010/0185327 A1* | 7/2010 | Nakajima | ................ | B25J 5/007 700/259 |
| 2010/0302364 A1* | 12/2010 | Kim | ................... | G01B 11/2531 348/136 |
| 2011/0001974 A1* | 1/2011 | Harada | ..................... | G03F 1/14 356/401 |
| 2011/0176731 A1* | 7/2011 | Fukushi | ................. | G06T 7/0026 382/170 |
| 2011/0206180 A1* | 8/2011 | Naidu | .................. | A61B 6/4028 378/19 |
| 2011/0249888 A1* | 10/2011 | Caceres | ............... | G11B 15/605 382/154 |
| 2012/0002198 A1* | 1/2012 | Jhung | ....................... | G01J 3/02 356/305 |
| 2012/0027289 A1* | 2/2012 | Naruse | .................... | G06T 7/001 382/152 |
| 2012/0068629 A1* | 3/2012 | Matsuda | ............ | H05B 33/0803 315/313 |
| 2012/0073120 A1* | 3/2012 | Shimazawa | ............ | G11B 5/105 29/603.07 |
| 2012/0185221 A1* | 7/2012 | Mori | ....................... | H05K 13/08 703/2 |
| 2013/0016140 A1* | 1/2013 | Oniki | ..................... | G09G 3/342 345/690 |
| 2013/0021461 A1* | 1/2013 | Zahniser | .................. | G01N 1/31 348/77 |
| 2013/0095849 A1* | 4/2013 | Pakzad | ................. | H04W 64/00 455/456.1 |
| 2013/0314731 A1* | 11/2013 | Omi | .................... | H04N 1/00347 358/1.13 |
| 2013/0321602 A1* | 12/2013 | Hayama | ............. | A61B 1/00009 348/68 |
| 2014/0132962 A1* | 5/2014 | Petschik | .................. | G01D 5/285 356/492 |
| 2014/0152794 A1* | 6/2014 | Takahashi | .............. | G01B 11/24 348/79 |
| 2014/0233027 A1* | 8/2014 | Sutin | ....................... | G01J 3/024 356/303 |
| 2014/0249790 A1* | 9/2014 | Spilker | ............... | G06F 19/3437 703/11 |
| 2015/0111217 A1* | 4/2015 | Hendriks | ......... | G01N 33/57484 435/6.19 |
| 2015/0130373 A1* | 5/2015 | Van De Sluis | ........ | G08C 17/02 315/308 |
| 2015/0142171 A1* | 5/2015 | Li | .......................... | B25J 9/1692 700/251 |
| 2015/0237737 A1* | 8/2015 | Arai | ........................ | H05K 3/022 361/784 |
| 2015/0301781 A1* | 10/2015 | Ekkaia | .................. | G06F 3/1446 362/237 |
| 2015/0324997 A1* | 11/2015 | Murakami | ............ | G06T 7/0097 348/207.1 |
| 2016/0004926 A1* | 1/2016 | Kerner | ................... | G01B 11/24 348/46 |

FOREIGN PATENT DOCUMENTS

| | | |
|---|---|---|
| JP | 2012-032344 | 2/2012 |
| JP | 2012-159409 | 8/2012 |
| JP | 2012-159410 | 8/2012 |

* cited by examiner

IMAGE MEASUREMENT DEVICE

CROSS-REFERENCE TO RELATED APPLICATIONS

The present application claims foreign priority based on Japanese Patent Application No. 2014-037538, filed Feb. 27, 2014, the contents of which is incorporated herein by reference.

BACKGROUND OF THE INVENTION

1. Field of the Invention

The present invention relates to an image measurement device, and more specifically to improvement in an image measurement device that extracts an edge in a workpiece image obtained by photographing a workpiece, to measure a dimension of the workpiece.

2. Description of Related Art

An image measurement device is a device that photographs a workpiece to acquire a workpiece image and extracts an edge in the workpiece image to measure a dimension and a shape of the workpiece (e.g., JP 2012-32224 A, JP 2012-32341 A, JP 2012-32344 A, JP 2012-159409 A, and JP 2012-159410 A). Normally, the workpiece is placed on a movable stage that is movable in X-, Y-, and Z-axis directions. By moving the movable stage in the Z-axis direction, the workpiece image is brought into focus, and by moving the movable stage in the X- or Y-axis direction, a position of the workpiece is adjusted into a field of view.

Since the workpiece image is an extremely accurate analog of the workpiece irrespective of a position of the movable stage in the Z-axis direction, determination of a distance and an angle on the workpiece image allows detection of an actual dimension on the workpiece. Edge extraction is performed by analyzing a change in luminance of the workpiece image, detecting edge points, and fitting a geometric figure such as a straight line, a circle, or an arc to the detected plurality of edge points, whereby an edge showing a boundary between the workpiece and a background, and roughness on the workpiece is obtained. The dimension of the workpiece is measured as a distance or an angle between the edges obtained in such a manner, or a central position or a diameter of a circular edge. Further, a difference (error) between the measured dimension value and a design value is compared as a tolerance, to perform quality determination.

In the case of measuring an outer shape of the workpiece by use of such an image measurement device, there is often used transmittance illumination for irradiating the workpiece on the stage with illumination light from the opposite side to a camera. In contrast, in the case of measuring a non-through hole, a step, and roughness on the workpiece, there is often used epi-illumination for irradiating the workpiece on the stage with illumination light from the same side as the camera.

In the conventional image measurement device, a texture on the workpiece surface, namely, a processing mark, a pattern or fine roughness, may be erroneously extracted as an edge in dimension measurement using the epi-illumination, and the dimension measurement is thus difficult to stabilize as compared to the case of using the transmittance illumination, which has been problematic. Especially, in the case of photographing the workpiece on the stage by use of a camera with a low photographing magnification, an edge cannot be stably extracted, which has been problematic.

Normally, in the dimension measurement, a vertical plane, which is parallel to a photographing axis of the camera, is extracted as an edge. However, since the camera with a low photographing magnification has a large depth of field, even when the upper end of the vertical plane is initially brought into focus, the lower end of the vertical plane is also brought into focus. Hence, correct edge extraction has been difficult since it is influenced not only by a texture on the upper end of the vertical plane but also by a texture on the lower end of the vertical plane.

SUMMARY OF THE INVENTION

The present invention has been made in view of the above circumstances, and an object thereof is to provide an image measurement device capable of performing stable edge extraction. In particular, an object thereof is to provide an image measurement device capable of suppressing erroneous extraction of a texture on a workpiece surface as an edge in dimension measurement using epi-illumination. Further, an object thereof is to provide an image measurement device capable of correctly extracting a step as an edge in the case of measuring a workpiece having the step in a photographing axis direction of a camera.

An image measurement device according to one embodiment of the invention includes: a stage for placing a workpiece; a camera that photographs the workpiece on the stage and generates a workpiece image; a side-emitting illumination device that has a light amount distribution sharply changing in a photographing axis direction of the camera, and irradiates the workpiece on the stage with illumination light from a side; a measurement target place specifying unit that specifies a measurement target place on the workpiece image; a relative position adjusting unit that moves the stage or the side-emitting illumination device in the photographing axis direction, to adjust a relative position of the side-emitting illumination device to the stage; a relative position identifying unit that obtains a change in luminance in the measurement target place with respect to two or more of the workpiece images photographed by making the relative position different, to identify a relative position; an imaging control unit that controls the relative position adjusting unit based on the identified relative position, and drives the side-emitting illumination device, to acquire the workpiece image; and a dimension measuring unit that extracts an edge of the measurement target place based on the acquired workpiece image, to obtain a dimension of the measurement target place based on the extracted edge.

In this image measurement device, since the side-emitting illumination device has the light amount distribution that sharply changes in the photographing axis direction of the camera, an irradiation position of the workpiece on the stage with the illumination light can be localized in the photographing axis direction. For example, in the case of measuring the workpiece having a step in the photographing axis direction, the workpiece can be photographed by irradiating either an upper end part or a lower end part of the step with the illumination light. Localization of the irradiation position with the illumination light in this manner can prevent an influence of a texture at a position distant from the measurement target place in the photographing axis direction. For this reason, in dimension measurement using the epi-illumination, it is possible to suppress erroneous extraction of the texture on the workpiece surface as an edge.

Further, since the influence of the texture at the position distant from the measurement target place in the photographing axis direction is prevented, it is possible to correctly extract a desired edge even in the case of photographing the workpiece by use of a camera with a low photographing magnification. For example, in the case of measuring a workpiece having a step in the photographing axis direction, when the workpiece is photographed by irradiating only the upper end part or the lower end part of the step with the illumination light, the step can be correctly extracted as an edge.

Moreover, a change in luminance in the measurement target place is obtained with respect to two or more workpiece images photographed by making the relative position different, and the relative position is then identified, whereby it is possible to automatically identify a suitable irradiation position with the illumination light for extracting an edge of the measurement target place and photograph the workpiece.

In addition to the above configuration, an image measurement device according to another embodiment of the invention is configured such that the side-emitting illumination device performs irradiation with illumination light as parallel light or illumination light having a spread angle close to the parallel light, the illumination light having a change region on a peripheral part of the light amount distribution narrower than a depth of field of the camera.

With such a configuration, by adjusting the relative position of the side-emitting illumination device such that a boundary of the illumination light is located within the depth of field of the camera, it is possible to correctly extract an edge within the depth of field without being influenced by the texture distant from the measurement target place.

In addition to the above configuration, an image measurement device according to still another embodiment of the invention is configured such that the side-emitting illumination device performs irradiation with the illumination light in a range narrower than the depth of field. With such a configuration, it is possible to perform illumination within the depth of field of the camera at a pinpoint with respect to the photographing axis direction, so as to correctly extract an edge within the depth of field.

In addition to the above configuration, an image measurement device according to still another embodiment of the invention is configured such that the side-emitting illumination device has a mirror that reflects illumination light, emitted in the photographing axis direction from a light source, toward a direction intersecting with the photographing axis direction, and a slit that limits a spread angle of the illumination light reflected by the mirror.

With such a configuration, since the illumination light emitted from the light source is bent by the mirror, it is possible to reduce the size of the side-emitting illumination device in a direction intersecting with the photographing axis direction. Further, with the spread angle of the illumination light limited by the slit, it is possible to perform irradiation with illumination light closer to parallel light.

In addition to the above configuration, an image measurement device according to still another embodiment of the invention is configured such that the slit of the side-emitting illumination device is a gap which is narrower than the depth of field of the camera. With such a configuration, it is possible to obtain illumination light narrower than the depth of field of the camera.

In addition to the above configuration, an image measurement device according to still another embodiment of the invention includes a diffused illumination device that has a ring-shaped light source surrounding the photographing axis of the camera, and irradiates the workpiece on the stage with diffused light from above, wherein the side-emitting illumination device has a light source arranged concentrically with the light source of the diffused illumination device, and is provided with the slit in a step part that is formed by making a lens-barrel part project in the photographing axis direction more than the lower end of the diffused illumination device.

With such a configuration, since the light source of the side-emitting illumination device is arranged concentrically with the light source of the diffused illumination device, it is possible to illuminate the periphery of the workpiece from the side. Further, since the slit is formed in the step part that is formed by making the lens-barrel part project in the photographing axis direction more than the lower end of the diffused illumination device, it is possible to arrange the diffused illumination device and the side-emitting illumination device without increasing the size of the side-emitting illumination device in the direction intersecting with the photographing axis direction.

In addition to the above configuration, an image measurement device according to still another embodiment of the invention is configured such that the measurement target place specifying unit specifies, as the measurement target place, a region on the workpiece image photographed by irradiation with the diffused light of the diffused illumination device. With such a configuration, by use of the workpiece image photographed by irradiation with the diffused light, it is possible to specify the measurement target place while checking the whole image of the workpiece.

In addition to the above configuration, an image measurement device according to still another embodiment of the invention includes a measurement place information storage unit that holds two or more of the measurement target places in association with relative positions, wherein, with respect to each of the measurement target places held in the measurement place information storage unit, the imaging control unit repeatedly moves the stage or the side-emitting illumination device to the corresponding relative position and irradiates the workpiece on the stage with the illumination light of the side-emitting illumination device from a side to acquire the workpiece image. With such a configuration, when a plurality of measurement target places are specified on the same workpiece image, it is possible to sequentially extract edges of these measurement target places while adjusting the relative position of the side-emitting illumination device to the stage.

In addition to the above configuration, an image measurement device according to still another embodiment of the invention is configured such that the relative position identifying unit obtains a contrast in a vicinity of an edge of the measurement target place with respect to each of a plurality of the workpiece images photographed by irradiation with the illumination light of the side-emitting illumination device, to identify a relative position to be associated with the measurement target place based on the obtained contrasts. With such a configuration, it is possible to improve the stability of edge extraction by identifying a relative position to be associated with the measurement target place based on a relative position at which a workpiece image with a large contrast has been photographed out of the plurality of workpiece images photographed by making the relative position different.

In addition to the above configuration, an image measurement device according to still another embodiment of the invention is configured such that the imaging control unit controls the relative position adjusting unit such that an irradiation position with the illumination light matches with a focused position of the camera, to acquire the workpiece image. With such a configuration, it is possible to correctly extract an edge in an image region in focus.

According to the present invention, it is possible to provide an image measurement device capable of stably performing edge extraction. In particular, since an influence of a texture distant from a measurement target place in a photographing axis direction is prevented, it is possible to provide an image measurement device capable of suppressing erroneous extraction of a texture on the workpiece surface as an edge in dimension measurement using epi-illumination. Further, it is possible to provide an image measurement device capable of correctly extracting a step as an edge in the case of measuring a workpiece having a step in a photographing axis direction of a camera.

DETAILED DESCRIPTION OF PREFERRED EMBODIMENT

<Image Measurement Device 1>

Figure 1:
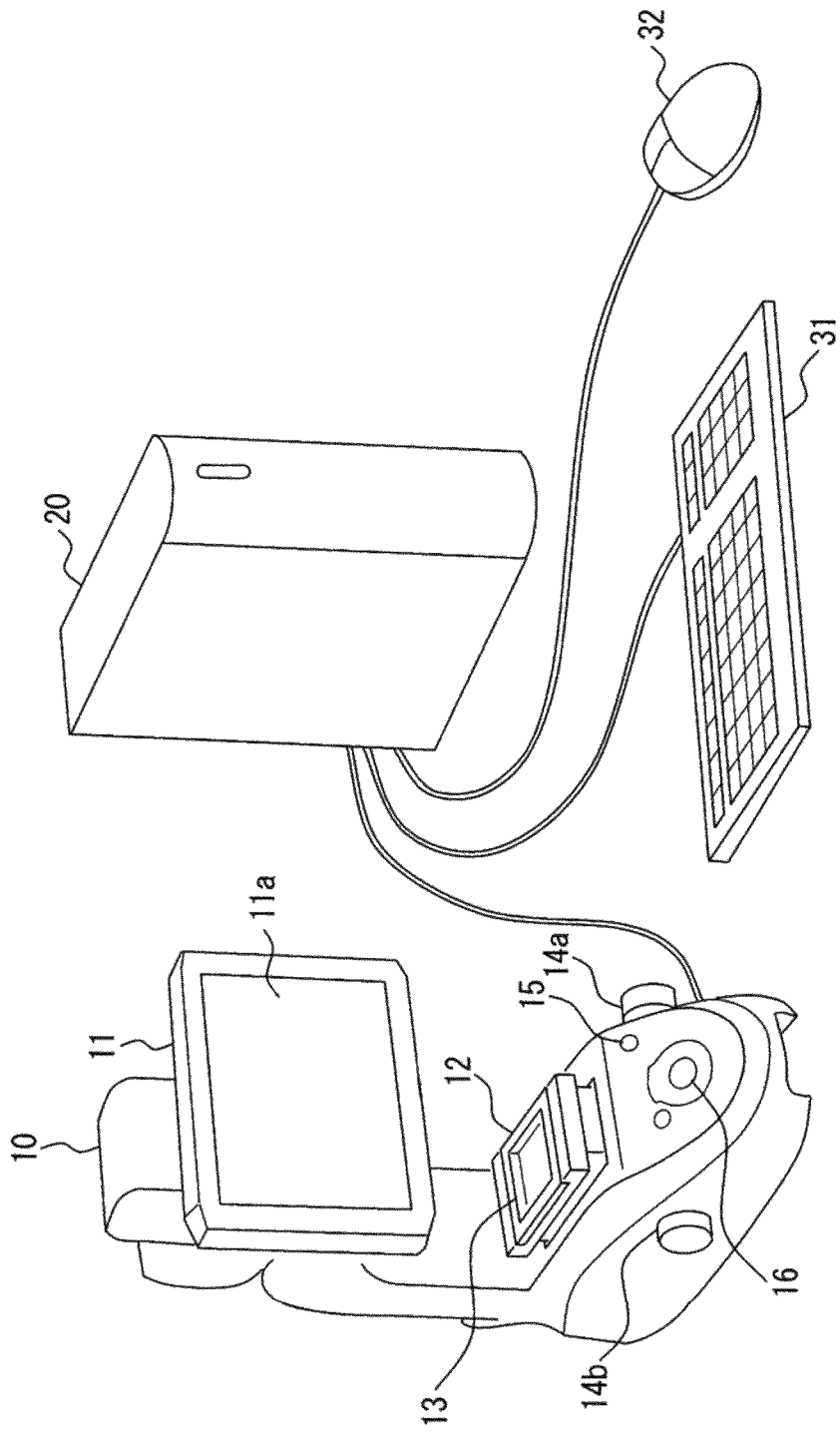
FIG. 1 is a perspective view showing one configuration example of an image measurement device 1 according to an embodiment of the present invention.

FIG. 1 is a perspective view showing one configuration example of an image measurement device 1 according to an embodiment of the present invention. This image measurement device 1 is a dimension measurement device that extracts an edge in a workpiece image obtained by photographing a workpiece to measure a dimension of the workpiece. The image measurement device 1 is configured by a measurement unit 10, a control unit 20, a keyboard 31, and a mouse 32. The workpiece is a measurement target whose shape and dimension are to be measured.

The measurement unit 10 includes a display device 11, a movable stage 12, an XY adjustment knob 14a, a Z adjustment knob 14b, a power switch 15, and an execute button 16. The measurement unit 10 irradiates the workpiece on the movable stage 12 with detection light being visible light and receives its transmitted light or reflected light to generate a workpiece image. The workpiece is placed in a detection area 13 of the movable stage 12. Further, the measurement unit 10 displays the workpiece image on a display screen 11a of the display device 11.

The display device 11 is a display device that displays a workpiece image or a measurement result on the display screen 11a. The movable stage 12 is a placement stage for placing the workpiece, and is provided with the detection area 13 where detection light is transmitted. The detection area 13 is a circular region made of transparent glass. This movable stage 12 can be moved in a Z-axis direction which is parallel to a photographing axis of a camera and in an X-axis direction and a Y-axis direction which is vertical to the photographing axis.

The XY adjustment knob 14a is an operation part for moving the movable stage 12 in the X-axis direction or the Y-axis direction to adjust the position in the X-axis direction and the Y-axis direction. The Z adjustment knob 14b is an operation part for moving the movable stage 12 in the Z-axis direction to adjust the position in the Z-axis direction. The power switch 15 is an operation part for switching a main power of each of the measurement unit 10 and the control unit 20 between an on-state and an off-state. The execute button 16 is an operation part for starting dimension measurement.

The control unit 20 is a controller part that controls photographing and screen display by the measurement unit 10 and analyzes a workpiece image to measure a dimension of the workpiece. The control unit 20 is connected with the keyboard 31 and the mouse 32. After turning-on of the power source, when the workpiece is arranged in the detection area 13 and the execute button 16 is operated, the dimension of the workpiece is automatically measured.

<Measurement Unit 10>

Figure 2:
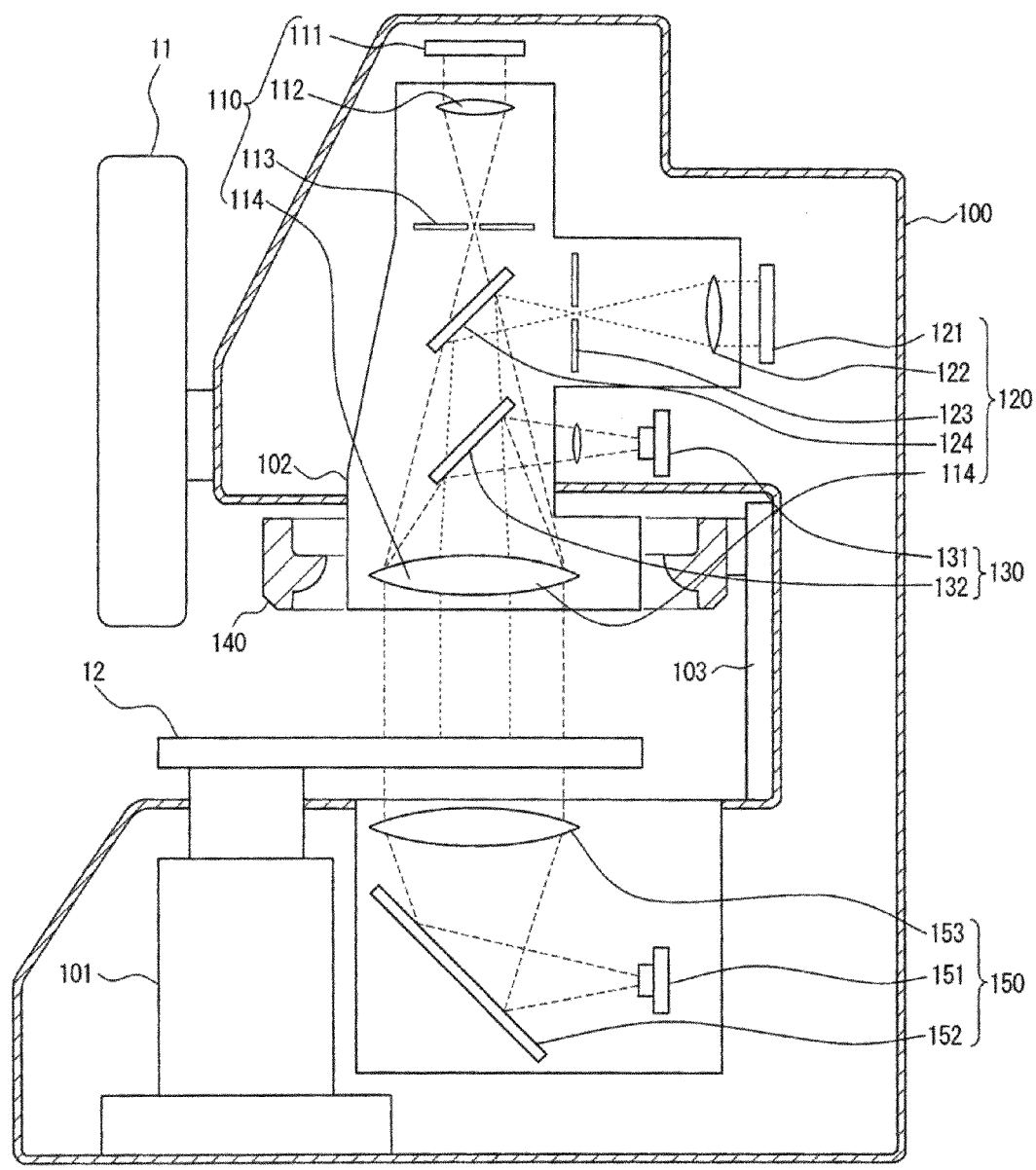
FIG. 2 is an explanatory view schematically showing a configuration example of a measurement unit 10 of FIG. 1, and shows a sectional plane in the case of cutting the measurement unit 10 by a vertical plane parallel to a photographing axis.

FIG. 2 is an explanatory view schematically showing a configuration example of the measurement unit 10 of FIG. 1, and shows a sectional plane in the case of cutting the measurement unit 10 by a vertical plane parallel to the photographing axis. This measurement unit 10 is configured by the display device 11, the movable stage 12, a casing 100, a stage adjusting part 101, a lens-barrel part 102, an illumination position adjusting part 103, cameras 110, 120, a coaxial epi-illumination unit 130, a ring illumination unit 140, and a transmittance illumination unit 150.

The stage adjusting part 101, the lens-barrel part 102, the cameras 110, 120, the coaxial epi-illumination unit 130 and the transmittance illumination unit 150 are arranged in the casing 100. The stage adjusting part 101 moves the movable stage 12 in the X-, Y-, or Z-axis direction based on a driving signal from the control unit 20, and adjusts the position of the workpiece in the X-, Y-, and Z-axis directions.

The camera 110 is an imaging device with a low photographing magnification, and is configured by an imaging element 111, an image forming lens 112, a diaphragm plate 113, and a light receiving lens 114. The imaging element 111 receives detection light and generates a workpiece image. This imaging element 111 is arranged with its light receiving surface facing downward. The image forming lens 112 is an optical member that forms an image with the detection light on the imaging element 111. The diaphragm plate 113 is an optical diaphragm that limits a transmitted light amount of the detection light, and is arranged between the image forming lens 112 and the light receiving lens 114. The light receiving lens 114 is an optical member that collects the detection light from the workpiece, and is arranged opposed to the movable stage 12. The image forming lens 112, the diaphragm plate 113, and the light receiving lens 114 are arranged with a vertically extending central axis taken as the center.

The camera 120 is an imaging device with a high photographing magnification, and is configured by an imaging element 121, an image forming lens 122, a diaphragm plate 123, a half mirror 124, and a light receiving lens 114. The imaging element 121 receives detection light and generates a workpiece image. This imaging element 121 is arranged with its light receiving surface facing toward a horizontal direction. The image forming lens 122 is an optical member that forms an image with the detection light on the imaging element 121. The diaphragm plate 123 is an optical diaphragm that limits a transmitted light amount of the detection light, and is arranged between the image forming lens 122 and the half mirror 124. The light receiving lens 114 is shared with the camera 110. The detection light transmitted through the light receiving lens 114 is bent in the horizontal direction by the half mirror 124, and an image is formed on the imaging element 121 via the diaphragm plate 123 and the image forming lens 122.

As the imaging elements 111 and 121, an image sensor such as a CCD (Charge Coupled Device) or a CMOS (Complementary Metal Oxide Semiconductor) is used. As the light receiving lens 114, a telecentric lens is used which has a property of not changing a size of an image even when its position in the vertical direction, namely, the photographing axis direction, changes.

The coaxial epi-illumination unit 130 is an epi-illumination device that irradiates the workpiece on the movable stage 12 with illumination light from above, and matches an optical axis of the illumination light with the photographing axis. This coaxial epi-illumination unit 130 is configured by a light source 131 that is arranged facing toward the horizontal direction, and a half mirror 132 that bends illumination light, emitted from the light source 131, downward.

The image forming lens 112, 122, the diaphragm plates 113, 123, the half mirrors 124, 132, and the light receiving lens 114 are arranged in the lens-barrel part 102.

The transmittance illumination unit 150 is a transmittance illumination device that irradiates the workpiece on the movable stage 12 with illumination light from below, and is configured by a light source 151, a mirror 152, and a condensing lens 153. The light source 151 is arranged facing toward the horizontal direction. Illumination light emitted from the light source 151 is reflected by the mirror 152 and emitted via the condensing lens 153. This illumination light is transmitted through the movable stage 12, and one part of the transmitted light is shielded by the workpiece and another part thereof is incident on the light receiving lens 114.

The ring illumination unit 140 is an epi-illumination device that irradiates the workpiece on the movable stage 12 with illumination light from above or from the side, and is formed in a ring shape surrounding the photographing axes of the cameras 110 and 120. As each of the light sources of the illumination units 130 to 150, an LED (Light-Emitting Diode) or a halogen lamp is used. The illumination position adjusting part 103 is a relative position adjusting unit that moves the ring illumination unit 140 in the photographing axis direction to adjust a relative position of a side-emitting illumination device 40 to the movable stage 12. As the workpiece illuminating method, any one of transmittance illumination, ring illumination, and coaxial epi-illumination can be selected.

<Ring Illumination Unit 140>

Figure 3:
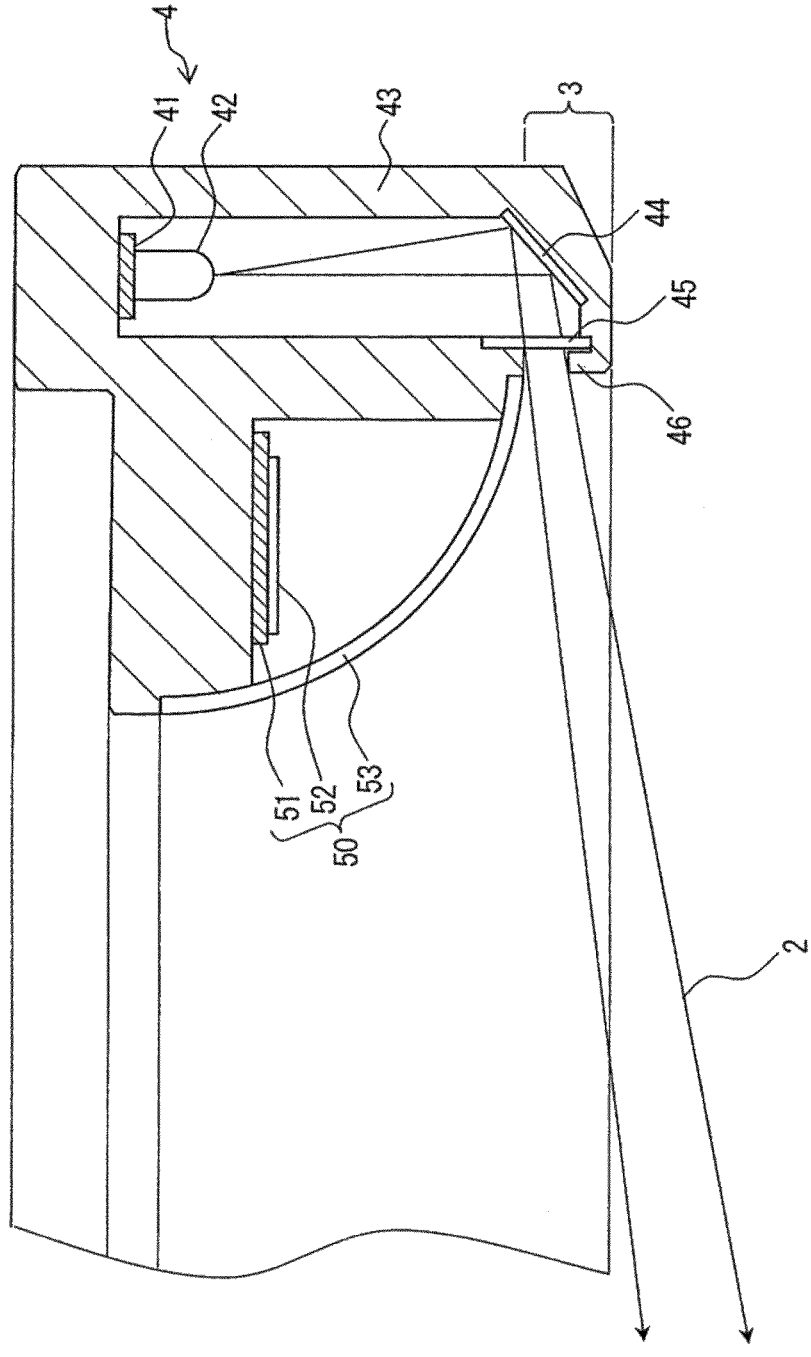
FIG. 3 is a sectional view showing a configuration example of a ring illumination unit 140 of FIG. 2.

FIG. 3 is a sectional view showing a configuration example of the ring illumination unit 140 of FIG. 2. This ring illumination unit 140 is an illumination device formed by coaxially arranging a side-emitting illumination device 40, which performs irradiation from the side with illumination light 2 having a spread angle close to parallel light, and a diffused illumination device 50 which performs irradiation with diffused light.

The side-emitting illumination device 40 is an epi-illumination device configured by a wiring substrate 41, a light source 42, a lens-barrel part 43, a mirror 44, a diffusion plate 45, and a slit 46, and has a light amount distribution that sharply changes in the photographing axis direction. The lens-barrel part 43 is formed of a cylindrical internal space extending in the photographing axis direction, and houses the wiring substrate 41, the light source 42, the mirror 44 and the diffusion plate 45.

The wiring substrate 41 and the light source 42 are arranged on a lid part of the lens-barrel part 43, and the mirror 44, the diffusion plate 45 and the slit 46 are arranged on the bottom of the lens-barrel part 43. The light source 42 is disposed on the wiring substrate 41 in the state of being faced downward. For example, an LED (Light-Emitting Diode) is used as the light source 42. The light source 42 is a ring-shaped light source with two or more LED's arranged on its circumference.

The mirror 44 is an optical member that reflects the illumination light 2, emitted in the photographing axis direction from the light source 42, in a direction intersecting with the photographing axis direction. This mirror 44 is formed of an annular reflective plate, and is arranged inclined on the order of 45°. Since the illumination light 2 emitted from the light source 42 is bent by the mirror 44, it is possible to reduce a size of the side-emitting illumination device 40 in the direction intersecting with the photographing axis direction while ensuring an optical path from the light source 42 to the slit 46.

The slit 46 is a spread angle limiting part that limits a spread angle of the illumination light 2 reflected by the mirror 44. The slit 46 is a gap in the photographing axis direction, and is formed in a shape extending in a circumferential direction. This slit 46 is arranged at a position distant from the light source 42 by a certain distance. With the spread angle of the illumination light 2 limited by the slit 46, it is possible to perform irradiation with the illumination light 2 closer to parallel light. For example, the slit 46 is formed of a gap narrower than a depth of field of the camera 110 for low-magnification photographing.

The diffusion plate 45 is a diffusion plate with a high aspect ratio that diffuses the illumination light 2 in the circumferential direction, and is arranged between the mirror 44 and the slit 46. This diffusion plate 45 is formed in a cylindrical shape extending in the photographing axis direction. By arranging such a diffusion plate 45, even when the light source 42 includes a large number of discretely arranged LED's, it is possible to prevent occurrence of unevenness of the light amount in the circumferential direction.

The optical axis of the illumination light 2 emitted from a light projection window of the side-emitting illumination device 40 is inclined within the range of 0° or more and 45° or less with respect to the horizontal direction. For example, the optical axis of the illumination light 2 is inclined on the order of 30° with respect to the horizontal direction.

The diffused illumination device 50 is an epi-illumination device configured by a wiring substrate 51, a light source 52 and a diffusion plate 53, and the light source 52 is a ring-shaped light source surrounding the photographing axes of the cameras 110 and 120. The light source 52 is disposed on the wiring substrate 51 in the state of being faced downward. The diffusion plate 53 is an optical member that diffuses illumination light, emitted from the light source 52, in a circumferential direction or a radial direction. This diffusion plate 53 has an annular shape, and its sectional shape by a vertical plane parallel to the photographing axis is formed of an arc-shaped curved plane. The workpiece on the movable stage 12 is irradiated with the diffused light from above or from the side.

The lens-barrel part 43 of the side-emitting illumination device 40 is formed outside the diffused illumination device 50 in the radial direction, and the light source 42 is arranged concentrically with the light source 52 of the diffused illumination device 50. Further, the slit 46 is formed in a step part 3 formed by making the lens-barrel part 43 project in the photographing axis direction more than the lower end of the diffused illumination device 50. Since the light source 42 of the side-emitting illumination device 40 is arranged concentrically with the light source 52 of the diffused illumination device 50, the periphery of the workpiece can be illuminated from the side. Further, since the slit 46 is formed in the step part 3, the diffused illumination device 50 and the side-emitting illumination device 40 can be arranged without increasing the size of the side-emitting illumination device 40 in the direction intersecting with the photographing axis direction.

Figure 4:
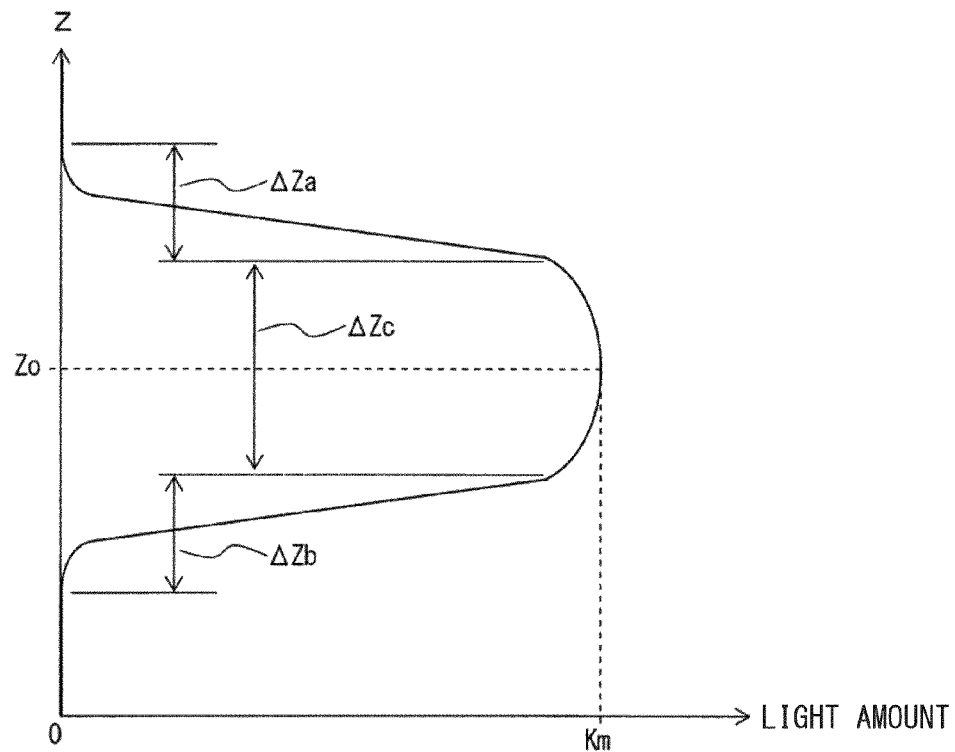
FIG. 4 is a diagram showing one example of a light amount distribution of a side-emitting illumination device 40 of FIG. 3.

FIG. 4 is a diagram showing one example of the light amount distribution of the side-emitting illumination device 40 of FIG. 3. In FIG. 4, the light amount distribution of the illumination light 2 in the vicinity of the detection area 13 of the movable stage 12 is shown with a horizontal axis indicating a light amount and a vertical axis indicating a position in the Z-axis direction. FIG. 4 shows a case where the illumination light 2 has an approximately linear symmetric light amount distribution with a position Zo in the Z-axis direction taken as the center.

The light amount distribution of the illumination light 2 corresponds to an illumination intensity distribution on the workpiece in the case of irradiating the workpiece on the movable stage 12 with the illumination light 2. The light amount is the maximum value Km at the position Zo in the Z-axis direction, and sharply decreases as the position becomes farther from the position Zo. In view of correctly extracting finer roughness as an edge by making clear a boundary between an irradiation portion and a non-irradiation portion with the illumination light 2, it is more preferable that the change regions $\Delta Za$ and $\Delta Zb$ on a peripheral part of the light amount distribution is narrower.

For example, each of the change regions $\Delta Za$ and $\Delta Zb$ is a region where the light amount changes from the order of 90% to the order of 10% of the maximum value Km, and it is narrower than the depth of field of the camera 110 for low-magnification photographing. With such a configuration, by adjusting the relative position of the ring illumination unit 140 such that a boundary of the illumination light 2 is located within the depth of field of the camera 110, it is possible to correctly extract an edge within the depth of field without being influenced by a texture distant from the measurement target place.

Furthermore, a width $\Delta Zc$ of the illumination light 2 in the Z-axis direction is sufficiently narrower than the depth of field of the camera 110, and a range narrower than the depth of field of the camera 110 is irradiated with the illumination light 2. With such a configuration, it is possible to perform illumination within the depth of field of the camera 110 at a pinpoint with respect to the photographing axis direction, so as to correctly extract an edge within the depth of field.

Figure 5:
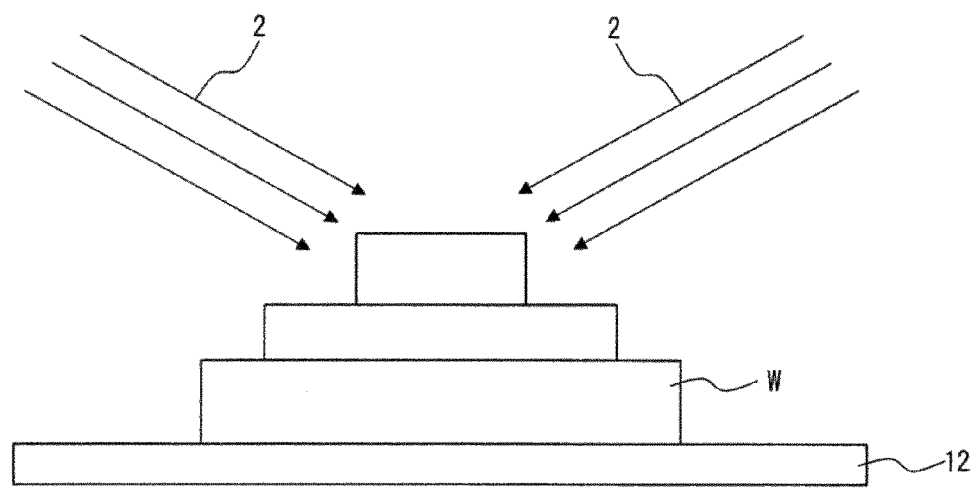
FIG. 5 is a view showing one example of operation of the measurement unit 10 of FIG. 2, and shows a case where an upper end part of a workpiece W on a movable stage 12 is irradiated with illumination light 2 of side-emitting illumination.
Figure 6:
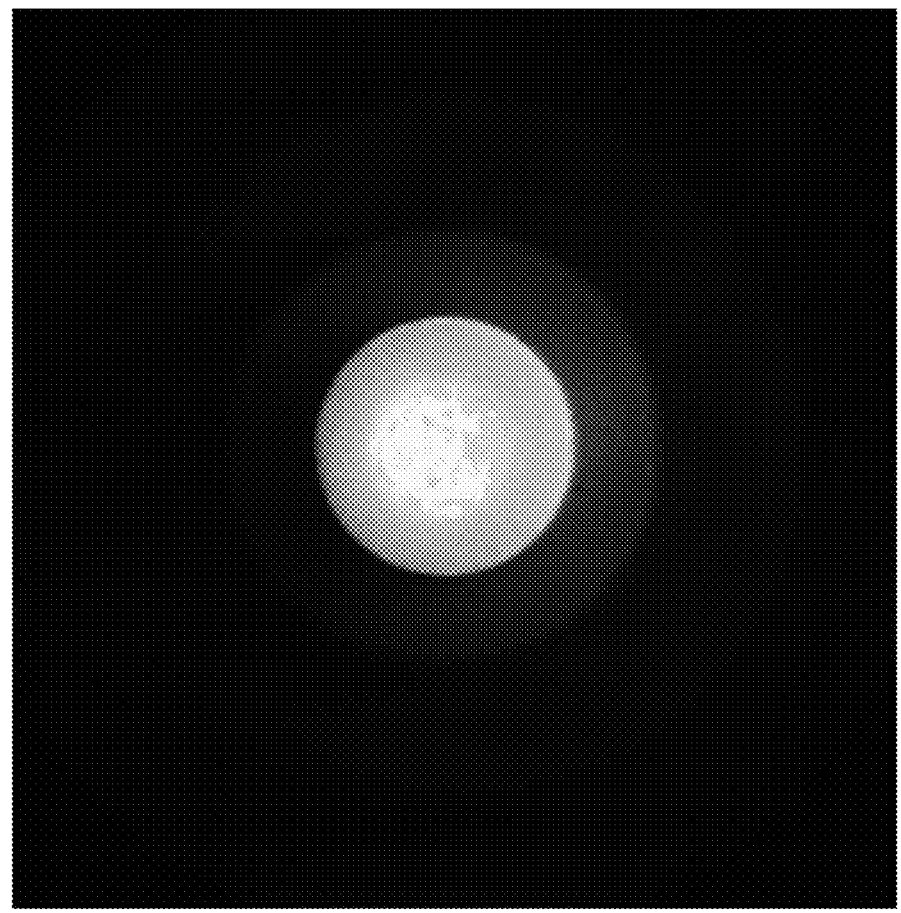
FIG. 6 is a view showing one example of the operation of the Measurement unit 10 of FIG. 2, and shows a workpiece image photographed in the state of FIG. 5.

FIG. 5 is a view showing one example of operation of the measurement unit 10 of FIG. 2, and shows a case where an upper end part of a workpiece W on the movable stage 12 is irradiated with the illumination light 2 of the side-emitting illumination. Further, FIG. 6 is a view showing one example of the operation of the measurement unit 10 of FIG. 2, and shows a workpiece image photographed in the state of FIG. 5.

Since the side-emitting illumination device 40 has the light amount distribution that sharply changes in the photographing axis direction, an irradiation position of the workpiece W on the movable stage 12 with the illumination light 2 can be localized in the photographing axis direction. For this reason, in the case of measuring the workpiece W having a step in the photographing axis direction, the workpiece W can be photographed by irradiating only the upper end part of the step with the illumination light 2.

In this example, only the upper end part of the workpiece W is irradiated with the illumination light 2, and in the workpiece image, luminance greatly changes in the vicinity of the edge of the upper end. Localization of the irradiation position with the illumination light 2 in this manner can prevent an influence of a texture at a position distant from the measurement target place in the photographing axis direction.

Figure 7:
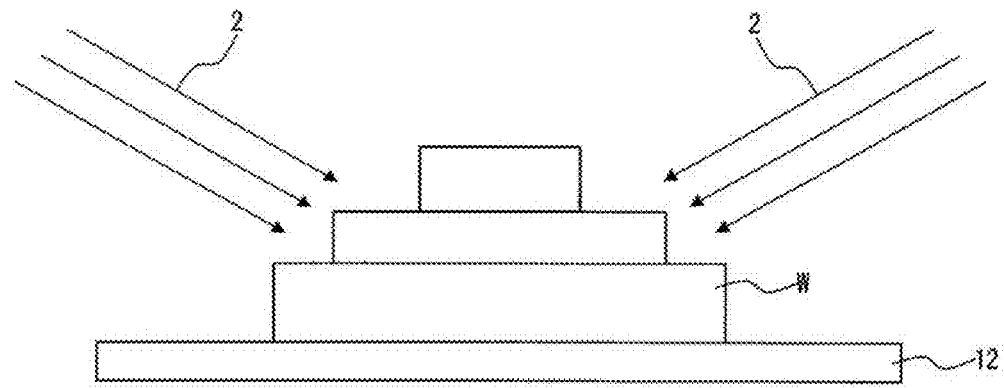
FIG. 7 is a view showing one example of operation of the measurement unit 10 of FIG. 2, and shows a case where an intermediate part of the workpiece W on the movable stage 12 is irradiated with the illumination light 2 of the side-emitting illumination.
Figure 8:
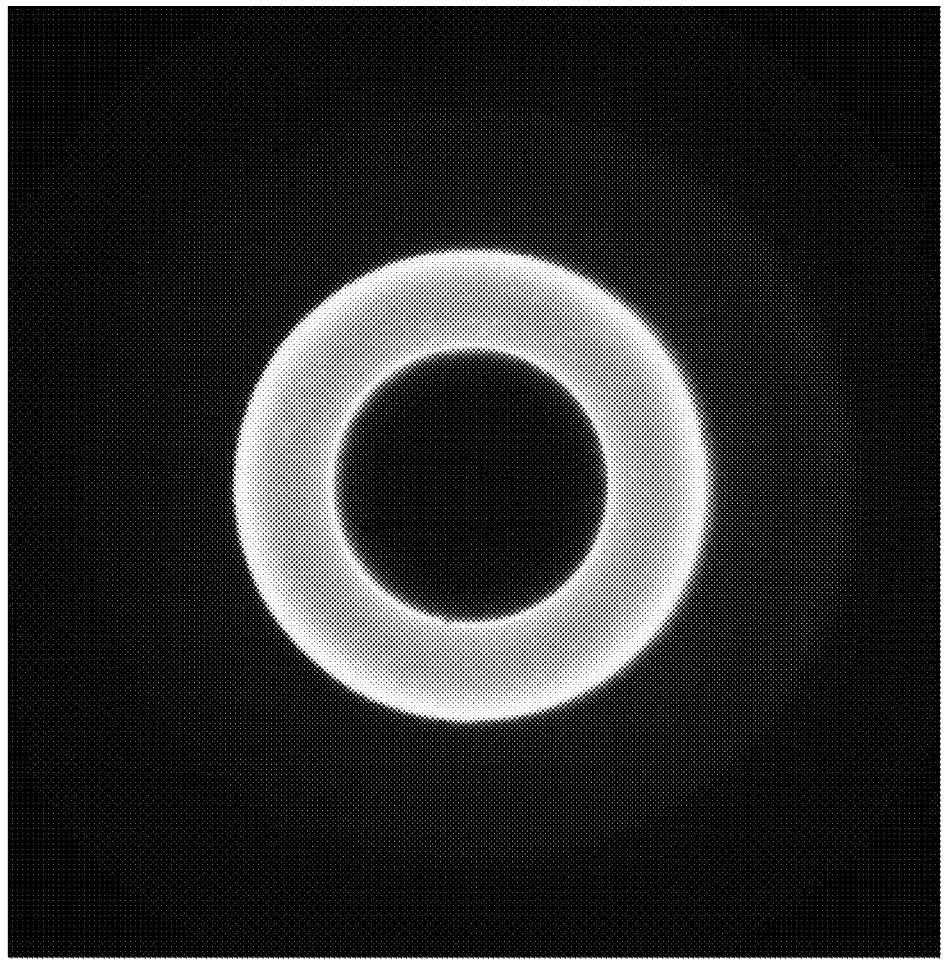
FIG. 8 is a view showing one example of the operation of the measurement unit 10 of FIG. 2, and shows a workpiece image photographed in the state of FIG. 7.

FIG. 7 is a view showing one example of operation of the measurement unit 10 of FIG. 2, and shows a case where an intermediate part of the workpiece W on the movable stage 12 is irradiated with the illumination light 2 of the side-emitting illumination. Further, FIG. 8 is a view showing one example of the operation of the measurement unit 10 of FIG. 2, and shows a workpiece image photographed in the state of FIG. 7.

In this example, only the intermediate part of the workpiece W is irradiated with the illumination light 2, and in the workpiece image, luminance greatly changes in the vicinity of the edge of the intermediate part. Localization of the irradiation position with the illumination light 2 in this manner can prevent an influence of a texture at a position distant from the measurement target place in the photographing axis direction.

<Control Unit 20>

Figure 9:
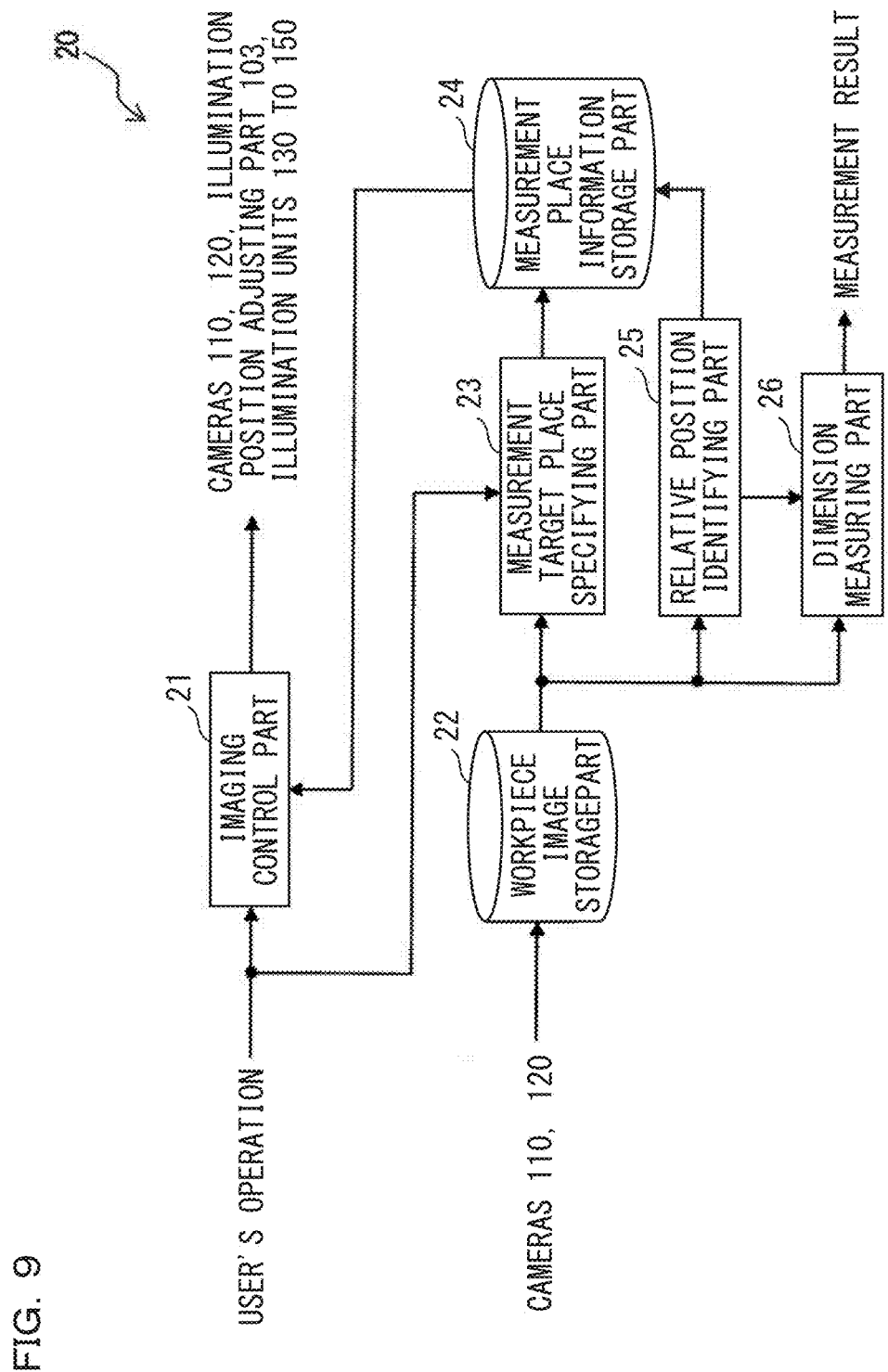
FIG. 9 is a block diagram showing one example of a function configuration in a control unit 20 of FIG. 1.

FIG. 9 is a block diagram showing one example of a function configuration in the control unit 20 of FIG. 1. This control unit 20 is configured by an imaging control part 21, a workpiece image storage part 22, a measurement target place specifying part 23, a measurement place information storage part 24, a relative position identifying part 25, and a dimension measuring part 26.

The imaging control part 21 controls the cameras 110, 120, the illumination position adjusting part 103 and the illumination units 130 to 150 based on the user's control, to acquire a workpiece image from the cameras 110, 120, and stores the workpiece image into the workpiece image storage part 22.

The measurement target place specifying part 23 specifies a measurement target place on the workpiece image. For example, based on the user's operation, the measurement target place specifying part 23 specifies as the measurement target place a region on a workpiece image photographed by irradiation with the diffused light of the diffused illumination device 50. By use of the workpiece image photographed by irradiation with the diffused light, it is possible to specify the measurement target place while checking the whole image of the workpiece. Positional information indicating the measurement target place and a measurement type are stored as measurement place information into the measurement place information storage part 24.

The relative position identifying part 25 obtains a change in luminance in the measurement target place with respect to two or more workpiece images photographed by making the relative position of the side-emitting illumination device 40 to the movable stage 12 different, to identify the relative position. The above two or more workpiece images are workpiece images obtained by photographing the same workpiece through use of illumination by the side-emitting illumination device 40. For example, the relative position identifying part 25 obtains a contrast of an image in the measurement target place with respect to each of a plurality of the workpiece images photographed by irradiation with the illumination light 2 by the side-emitting illumination device 40, and compares the obtained contrasts, to identify a relative position, at which the workpiece image with the largest contrast has been photographed, as a relative position to be associated with the measurement target place.

Generally, as the contrast of the image is larger, the edge extraction is more stable. Such a contrast of the measurement target place is obtained as an evaluation value indicating the stability of edge extraction, a workpiece image with the highest evaluation value, namely, a workpiece image with the largest contrast, is extracted out of a plurality of workpiece images photographed by making the relative position of the side-emitting illumination device 40 different, and the relative position is then identified, thereby allowing improvement in stability of the edge extraction.

In addition, as the method for identifying the relative position to be associated with the measurement target place, there is a method other than the above method in which a workpiece image with the largest contrast in the measurement target place is identified out of a plurality of workpiece images, and a relative position at which the workpiece image has been obtained is identified as the above relative position. For example, it may be configured such that, based on three or more workpiece images with different relative positions of the side-emitting illumination device 40 to the movable stage 12, a distribution including the contrast at each relative position is obtained, and a curve such as a quadratic curve is applied to this distribution, to estimate a relative position where a contrast is the largest.

In the measurement place information storage part 24, two or more measurement target places are held in association with relative positions. The measurement target place and the relative position are held as measurement place information. The imaging control part 21 controls the illumination position adjusting part 103 based on the relative position identified by the relative position identifying part 25, and drives the side-emitting illumination device 40 to acquire a workpiece image. Based on the workpiece image acquired by the imaging control part 21, the dimension measuring part 26 extracts an edge of the measurement target place, obtains a dimension of the measurement target place based on the extracted edge, and outputs the measurement result.

Since the relative position is identified based on two or more workpiece images photographed by making the relative position of the side-emitting illumination device 40 to the movable stage 12 different, it is possible to photograph the workpiece by automatically identifying a suitable irradiation position with the illumination light 2 for extracting an edge of the measurement target place.

With respect to each measurement target place held in the measurement place information storage part 24, the imaging control part 21 repeatedly moves the side-emitting illumination device 40 to the corresponding relative position, and irradiates the workpiece on the movable stage 12 with the illumination light 2 of the side-emitting illumination device 40 from the side to acquire the workpiece image. With such a configuration, when a plurality of measurement target places are specified on the same workpiece image, edges of these measurement target places can be sequentially extracted while the relative position of the side-emitting illumination device 40 to the movable stage 12 is adjusted.

Further, the imaging control part 21 controls the illumination position adjusting part 103 such that the irradiation position with the illumination light 2 matches with a focused position of the camera 110, to acquire the workpiece image. With such a configuration, an edge in an image region in focus can be correctly extracted.

A measurement result such as a dimension value is displayed on the display device 11. Further, the control unit 20 creates measurement setting data for successively measuring the workpiece. This measurement setting data is includes positioning information, measurement place information, information indicating a design value and a tolerance for each measurement target place. The positioning information is information for analyzing a workpiece image to detect a position and a posture of the workpiece.

Figure 10:
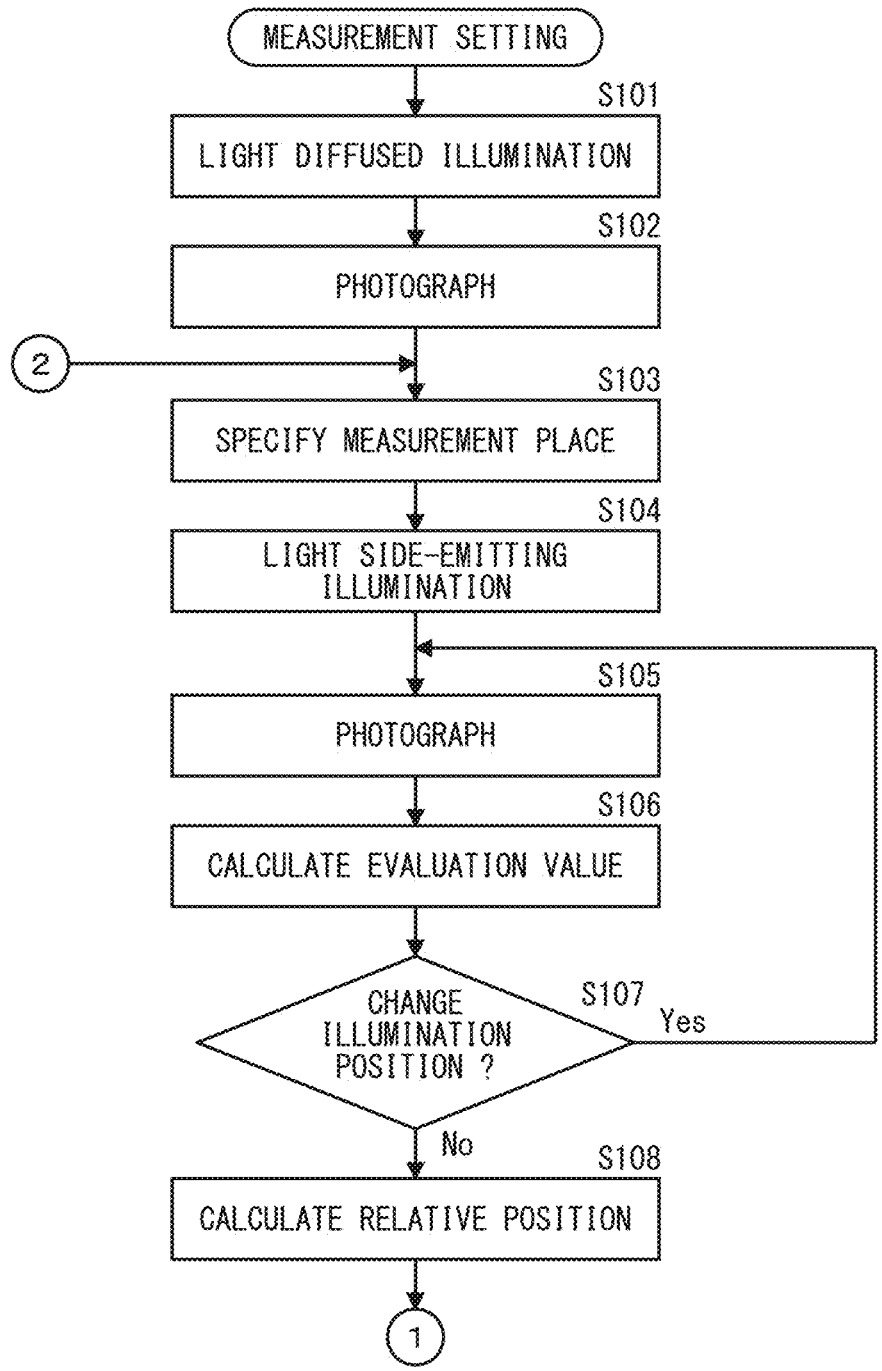
FIG. 10 is a flowchart showing one example of operation at the time of measurement setting in the image measurement device 1 of FIG. 1.
Figure 11:
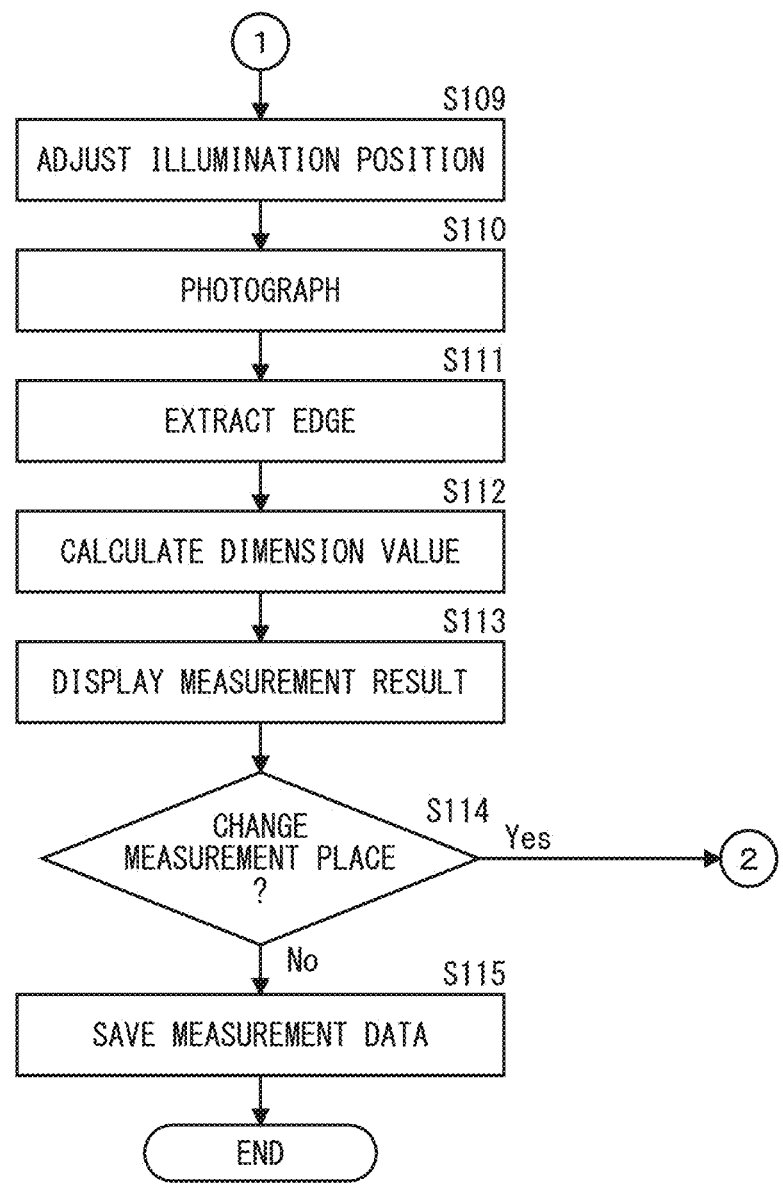
FIG. 11 is a flowchart showing one example of the operation at the time of measurement setting in the image measurement device 1 of FIG. 1.

Steps S101 to S—115 of FIGS. 10 and 11 are a flowchart showing one example of operation at the time of measurement setting in the image measurement device 1 of FIG. 1. First, the control unit 20 lights the diffused illumination device 50 of the ring illumination unit 140, photographs the workpiece on the movable stage 12 by the camera 110 (Steps S101, S102), and displays on the display device 11 a workpiece image acquired from the camera 110.

Next, the control unit 20 accepts the user's operation, and when a measurement target place is specified on the workpiece image (Step S103), the control unit 20 lights the side-emitting illumination device 40 in place of the diffused illumination device 50 and photographs the workpiece on the movable stage 12 by the camera 110 (Steps S104, S105). Based on the workpiece image photographed by irradiation with the illumination light 2 from the side, the control unit 20 obtains a change in luminance in the measurement target place, and calculates a contrast in the vicinity of the edge as an evaluation value indicating the stability of the edge extraction (Step S106).

The control unit 20 controls the illumination position adjusting part 103 to repeat the processing procedure of Steps S105 and S106 while sequentially moving the ring illumination unit 140 to two or more previously set positions in the Z-axis direction (Step S107). Then, the control unit 20 compares the relative positions of the side-emitting illumination device 40 to the movable stage 12, namely, evaluation values of a plurality of workpiece images with different illumination positions, and calculates a relative position corresponding to the measurement target place (Step S108).

Next, in order to adjust the illumination position, the control unit 20 controls the illumination position adjusting part 103, to move the ring illumination unit 140 to the relative position calculated from the evaluation value (Step S109). Then, the control unit 20 photographs the workpiece on the movable stage 12, to acquire a workpiece image (Step S110).

The control unit 20 extracts an edge of the measurement target place based on the acquired workpiece image (Step S111), and calculates a dimension value of the measurement target place based on the extracted edge (Step S112), to display the edge and the dimension value as measurement results on the display device 11 (Step S113).

The control unit 20 accepts the user's operation, and when a different measurement target place is specified, the control unit 20 repeats the processing procedure of Step S103 and subsequent steps (Step S114). When the dimension measurement is completed with respect to all measurement target places, the control unit 20 creates measurement setting data, and completes this processing (Step S115).

Figure 12:
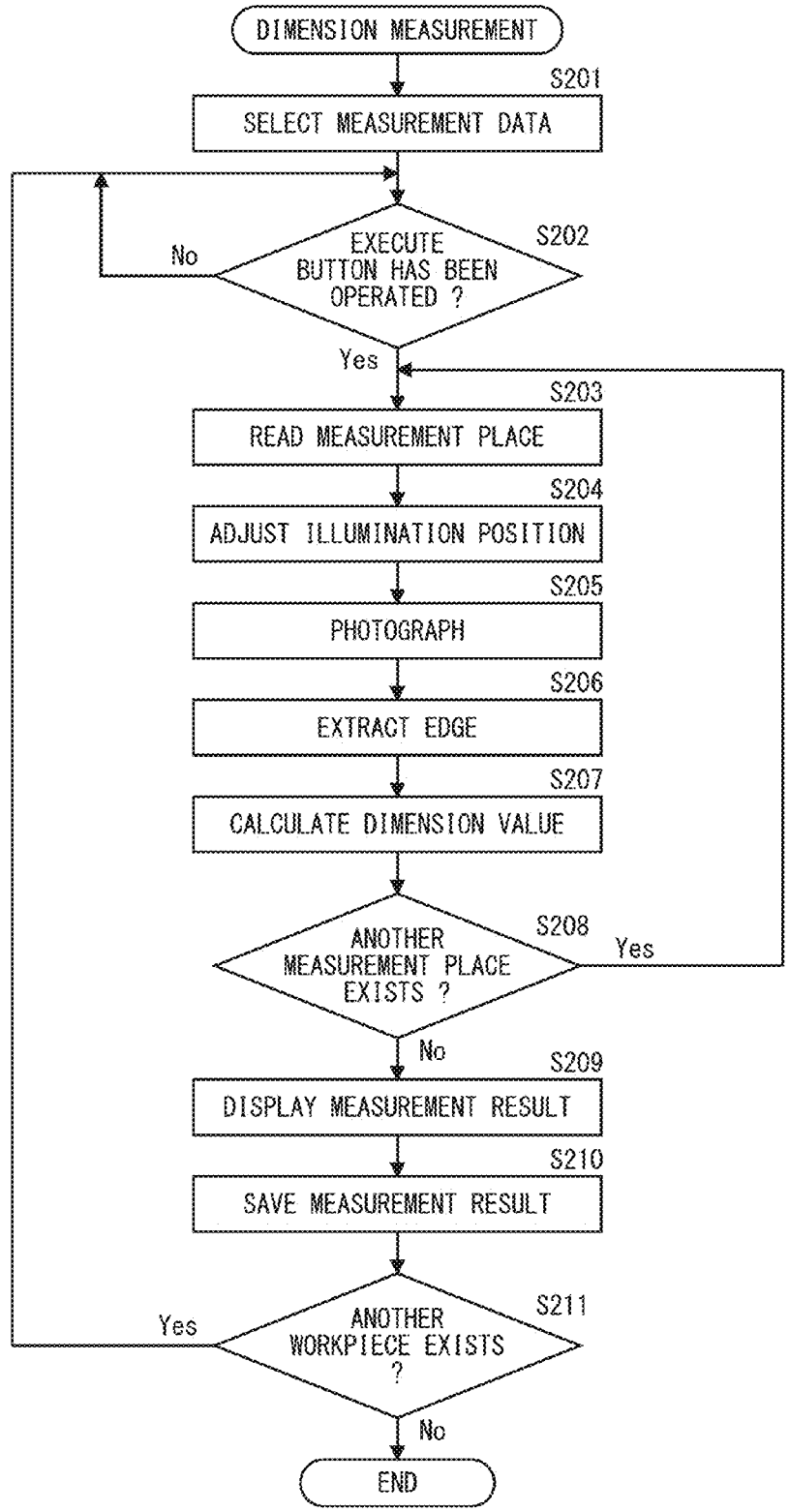
FIG. 12 is a flowchart showing one example of the operation at the time of dimension measurement in the image measurement device 1 of FIG. 1.

Steps S201 to S211 of FIG. 12 are a flowchart showing one example of the operation at the time of dimension measurement in the image measurement device 1 of FIG. 1. First, the control unit 20 accepts the user's operation, and selects measurement setting data in accordance with the workpiece as a successive measurement target (Step S201).

Next, when the execute button 16 of the measurement unit 10 is operated (Step S202), the control unit 20 reads the measurement target place held as the measurement setting data (Step S203), and controls the illumination position adjusting part 103 for adjusting the illumination position, to move the ring illumination unit 140 to the relative position associated with the measurement target position (Step S204). Then, the control unit 20 lights the side-emitting illumination device 40 and photographs the workpiece on the movable stage 12, to acquire a workpiece image (Step S205).

The control unit 20 extracts an edge of the measurement target place based on the acquired workpiece image (Step S206), and calculates a dimension value of the measurement target place based on the extracted edge (Step S207). When there is another measurement target place, the control unit 20 repeats the processing procedure from Step S203 to Step S207 (Step S208). When the dimension measurement is completed with respect to all measurement target places, the control unit 20 displays the edge and the dimension value as measurement results on the display device 11 (Step S209), and saves the measurement results (Step S210).

When there is another workpiece as a successive measurement target, the control unit 20 repeats the processing procedure of Step S202 and subsequent steps, and when there is no other workpiece as the successive measurement target, the control unit 20 completes this processing (Step S211).

According to the present embodiment, since the side-emitting illumination device 40 has the light amount distribution that sharply changes in the photographing axis directions of the cameras 110 and 120, an irradiation position of the workpiece on the movable stage 12 with the illumination light 2 can be localized in the photographing axis direction. Since such localization of the irradiation position prevents an influence of a texture at a position distant from the measurement target place in the photographing axis direction, it is possible to suppress erroneous extraction of a texture on the workpiece surface as an edge in dimension measurement using the epi-illumination.

Further, since the influence of the texture at the position distant from the measurement target place in the photographing axis direction is prevented, it is possible to correctly extract a desired edge even in the case of photographing the workpiece by use of the camera 110 with a low photographing magnification. Moreover, with respect to two or more workpiece images photographed by making the relative position different, a change in luminance in the measurement target place is obtained, and the relative position is then identified, whereby it is possible to photograph the workpiece by automatically identifying a suitable irradiation position with the illumination light 2 for extracting an edge of the measurement target place.

In the present embodiment, the description has been given to the example of the side-emitting illumination device 40 that reflects illumination light, emitted in the photographing axis direction from the light source 42, by the mirror 44 toward the direction intersecting with the photographing axis. However, the present invention does not limit the configuration of the side-emitting illumination device 40 to this example. For example, the side-emitting illumination device 40 may not include the mirror 44, and illumination light emitted in the horizontal direction from the light source 42 may be narrowed by the slit 46 to perform irradiation with the illumination light 2 having a spread angle close to parallel light.

Figure 13:
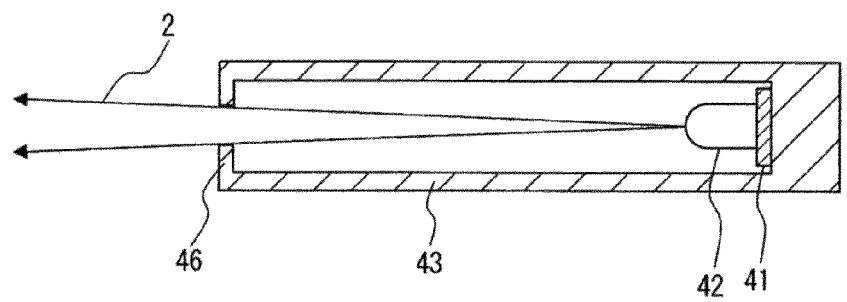
FIG. 13 is a sectional view showing another configuration example of the side-emitting illumination device 40.

FIG. 13 is a sectional view showing another configuration example of the side-emitting illumination device 40. This side-emitting illumination device 40 is configured by the wiring substrate 41, the light source 42, the lens-barrel part 43, and the slit 46. The lens-barrel part 43 has an internal space extending in the horizontal direction. The wiring substrate 41 and the light source 42 are arranged at a right end part of the lens-barrel part 43, and the slit 46 is formed at the left end of the lens-barrel part 43.

The light source 42 is disposed on the wiring substrate 41 in the state of being faced to the left side in the horizontal direction. The slit 46 controls the spread angle of the illumination light 2 emitted from the light source 42. This slit 46 is arranged at a position distant from the light source 42 by a certain distance. Even such a side-emitting illumination device 40 allows realization of an epi-illumination device having a light amount distribution that sharply changes in the photographing axis directions of the cameras 110 and 120.

Figure 14A:
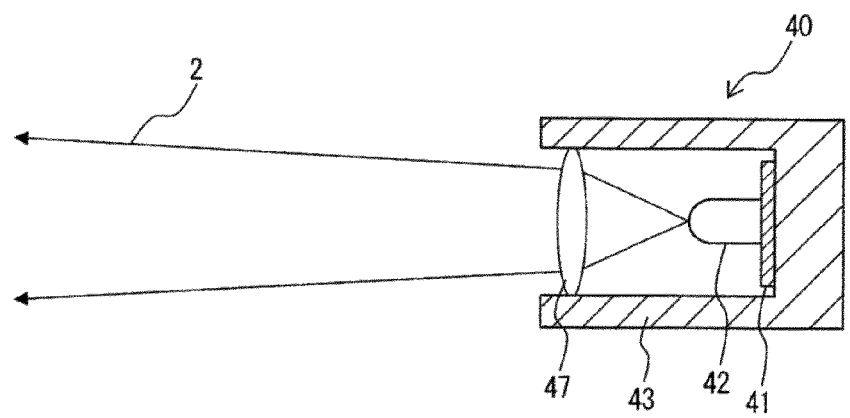
FIGS. 14A and 14B are sectional views each showing another configuration example of the side-emitting illumination device 40.
Figure 14B:
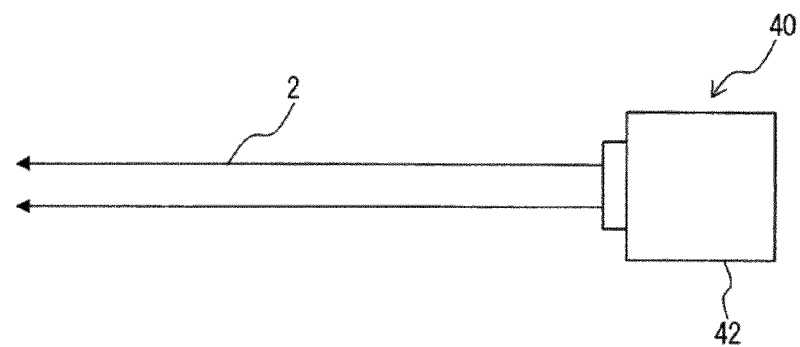

FIGS. 14A and 14B are sectional views each showing another configuration example of the side-emitting illumination device 40. FIG. 14A shows the case of obtaining the illumination light 2 having a spread angle close to parallel light by use of a condensing lens 47. FIG. 14B shows the case of obtaining the illumination light 2 as parallel light by use of the light source 42 that generates laser light.

The side-emitting illumination device 40 shown in FIG. 14A is configured by the wiring substrate 41, the light source 42, the lens-barrel part 43, and the condensing lens 47. The lens-barrel part 43 has an internal space extending in the horizontal direction. The wiring substrate 41 and the light source 42 are arranged at the right end part of the lens-barrel part 43, and the condensing lens 47 is arranged at the left end of the lens-barrel part 43.

The light source 42 is disposed on the wiring substrate 41 in the state of being faced to the left side in the horizontal direction. The condensing lens 47 is an optical member that obtains the illumination light 2 having a spread angle close to parallel light by collecting the illumination light 2 emitted from the light source 42.

The side-emitting illumination device 40 shown in FIG. 14B is configured by the light source 42 provided with a laser oscillator that generates laser light. The light source 42 is arranged facing the left side in the horizontal direction, and performs irradiation with laser light, emitted from the laser oscillator, as the illumination light 2 being parallel light. Even such a side-emitting illumination device 40 allows realization of an epi-illumination device having a light amount distribution that sharply changes in the photographing axis directions of the cameras 110 and 120.

Further, in the present embodiment, the description has been given to the example of the case where, based on a plurality of workpiece images photographed by making the relative position of the side-emitting illumination device 40 to the movable stage 12 different, the relative position to be associated with the measurement target place is identified. However, other than this, there exists a method for identifying the relative position to be associated with the measurement target place. For example, a height measuring unit that measures a height of the workpiece in the Z-axis direction may be provided, and based on a height measurement result, the relative position to be associated with the measurement target place may be identified. Further, the relative position to be associated with the measurement target place may be identified based on design information indicating a shape and a dimension of the workpiece.

Moreover, in the present embodiment, the description has been given to the example of the case of evaluating the stability of the edge extraction based on the contrast in the vicinity of the edge of the measurement target place. However, the present invention does not limit the method for evaluating the stability of the edge extraction thereto. For example, with respect to the measurement target place, an average value of luminance may be obtained, and based on the average value of the luminance, the stability of the edge extraction may be evaluated. As the average value of the luminance is higher, the stability of the edge extraction is higher. Alternatively, with respect to a region other than a region where an amount of change in luminance is large in the measurement target place, luminance unevenness may be obtained, and based on the luminance unevenness, the stability of the edge extraction may be evaluated. As the luminance unevenness is smaller, the stability of the edge extraction is higher.

Furthermore, in the present embodiment, the description has been given to the example of the case where, when the measurement target place is specified based on the user's operation, the workpiece images are acquired by photographing the workpiece on the movable stage 12 while making the relative position of the side-emitting illumination device 40 to the movable stage 12 different, and the relative position to be associated with the measurement target place is identified based on the obtained plurality of workpiece images. However, other than this, there exists a method for identifying the relative position to be associated with the measurement target place. For example, it may be configured such that workpiece images are acquired by photographing the workpiece on the movable stage 12 while making the relative position of the side-emitting illumination device 40 to the movable stage 12 different, and edge extraction is performed on each of the obtained workpiece images, to display on a common workpiece image a group of edges extracted from the plurality of workpiece images. From such a group of edges, an edge as the measurement target is specified.

Further, in the present embodiment, the description has been given to the example of the case where the illumination position adjusting part 103 adjusts the position of the ring illumination unit 140 in the Z-axis direction, to thereby adjust the relative position of the side-emitting illumination device 40 to the movable stage 12. However, the present invention does not limit the configuration of the relative position adjusting unit thereto. For example, the relative position adjusting unit may be configured such that the movable stage 12 is moved in the Z-axis direction, or the movable stage 12 and the side-emitting illumination device 40 are separately moved in the Z-axis direction, to thereby adjust the relative position of the side-emitting illumination device 40 to the movable stage 12.

What is claimed is:

1. An image measurement device comprising:
   a stage for placing a workpiece;
   a camera that photographs the workpiece on the stage and generates a workpiece image;
   a diffused illumination device that has a light source surrounding the photographing axis of the camera, and irradiates the workpiece on the stage with diffused light from above;
   a side-emitting illumination device that has a light amount distribution sharply changing in a photographing axis direction of the camera, and irradiates the workpiece on the stage with illumination light from a side;
   a measurement target place specifying unit that specifies a measurement target place on the workpiece image;
   a relative position adjusting unit that moves the side-emitting illumination device in the photographing axis direction, to adjust a relative position of the side-emitting illumination device to the stage;
   a relative position identifying unit that obtains a change in luminance in the measurement target place with respect to two or more of the workpiece images photographed at the different relative position to identify a relative position;
   a measurement place information storage unit that stores the measurement target place in association with the relative position identified by the relative position identifying unit;
   an imaging control unit that controls the relative position adjusting unit to move the side-emitting illumination device to the relative position with respect to the measurement target place stored in the measurement place information storage unit and drives the side-emitting illumination device, to acquire the workpiece image; and
   a dimension measuring unit that extracts an edge of the measurement target place based on the acquired workpiece image, to obtain a dimension of the measurement target place based on the extracted edge.

2. The image measurement device according to claim 1, wherein the side-emitting illumination device performs irradiation with illumination light as parallel light or illumination light having a spread angle close to the parallel light, the illumination light having a change region on a peripheral part of the light amount distribution narrower than a depth of field of the camera.

3. The image measurement device according to claim 2, wherein the side-emitting illumination device performs irradiation with the illumination light in a range narrower than the depth of field.

4. The image measurement device according to claim 1, wherein
the side-emitting illumination device has
a mirror that reflects illumination light, emitted in the photographing axis direction from a light source, toward a direction intersecting with the photographing axis direction, and
a slit that limits a spread angle of the illumination light reflected by the mirror.

5. The image measurement device according to claim 4, wherein the slit of the side-emitting illumination device is a gap which is narrower than the depth of field of the camera.

6. The image measurement device according to claim 4, wherein the side-emitting illumination device has a light source arranged concentrically with the light source of the diffused illumination device, and is provided with the slit in a step part that is formed by making a lens-barrel part project in the photographing axis direction more than the lower end of the diffused illumination device.

7. The image measurement device according to claim 6, wherein the measurement target place specifying unit specifies, as the measurement target place, a region on the workpiece image photographed by irradiation with the diffused light of the diffused illumination device.

8. The image measurement device according to claim 1, comprising a measurement place information storage unit that holds two or more of the measurement target places in association with relative positions,
wherein, with respect to each of the measurement target places held in the measurement place information storage unit, the imaging control unit repeatedly moves the stage or the side-emitting illumination device to the corresponding relative position and irradiates the workpiece on the stage with the illumination light of the side-emitting illumination device from a side, to acquire the workpiece image.

9. The image measurement device according to claim 1, wherein the relative position identifying unit obtains a contrast in a vicinity of an edge of the measurement target place with respect to each of a plurality of the workpiece images photographed by irradiation with the illumination light of the side-emitting illumination device, to identify a relative position to be associated with the measurement target place based on the obtained contrasts.

10. The image measurement device according to claim 1, wherein the imaging control unit controls the relative position adjusting unit such that an irradiation position with the illumination light matches with a focused position of the camera, to acquire the workpiece image.

* * * * *